United States Patent
Wang (10) Patent No.: US 10,824,213 B2
(45) Date of Patent: Nov. 3, 2020

(54) SENSOR PROCESSING METHOD OF MOBILE TERMINAL, NON-TRANSITORY STORAGE MEDIUM, AND ELECTRONIC DEVICE

(71) Applicant: GUANGDONG OPPO MOBILE TELECOMMUNICATIONS CORP., LTD., Dongguan, Guangdong (CN)

(72) Inventor: Bin Wang, Guangdong (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 136 days.

(21) Appl. No.: 16/081,468

(22) PCT Filed: May 31, 2017

(86) PCT No.: PCT/CN2017/086528
§ 371 (c)(1),
(2) Date: Aug. 31, 2018

(87) PCT Pub. No.: WO2017/206892
PCT Pub. Date: Dec. 7, 2017

(65) Prior Publication Data
US 2019/0064911 A1 Feb. 28, 2019

(30) Foreign Application Priority Data
May 31, 2016 (CN) .......................... 2016 1 0379895

(51) Int. Cl.
*G06F 1/3206* (2019.01)
*G06F 1/32* (2019.01)
(Continued)

(52) U.S. Cl.
CPC .............. *G06F 1/3206* (2013.01); *G06F 1/32* (2013.01); *G06F 1/325* (2013.01); *G06F 1/3287* (2013.01);
(Continued)

(58) Field of Classification Search
CPC combination set(s) only.
See application file for complete search history.

(56) References Cited

U.S. PATENT DOCUMENTS 9,124,778 B1   9/2015   Crabtree
9,407,675 B1   8/2016   Ludwig et al.
(Continued)

FOREIGN PATENT DOCUMENTS

CN   103176842   6/2013
CN   103596252   2/2014
(Continued)

OTHER PUBLICATIONS

Office Action for U.S. Appl. No. 16/432,384, dated Nov. 27, 2019.
(Continued)

*Primary Examiner* — Raymond N Phan
(74) *Attorney, Agent, or Firm* — Hodgson Russ LLP (57) ABSTRACT

A sensor processing method for a mobile terminal, a storage medium, and an electronic device are provided. The sensor processing method includes: detecting whether the mobile terminal is playing a video (S101); when it is detected that the mobile terminal is playing the video, traversing an active connection interface queue for sensors (S102); determining whether an application corresponding to a connection interface in the queue meets a filtering condition (S103); and if not, removing the connection interface from the active connection interface queue (S104).

20 Claims, 6 Drawing Sheets

(51) Int. Cl.
 *G06F 1/3234* (2019.01)
 *G06F 1/3287* (2019.01)
 *H04W 52/02* (2009.01)
 *G06F 1/3203* (2019.01)

(52) U.S. Cl.
 CPC ....... *H04W 52/0261* (2013.01); *G06F 1/3203* (2013.01)

(56) References Cited

U.S. PATENT DOCUMENTS

| | | | |
|---|---|---|---|
| 9,825,827 | B2 | 11/2017 | Andrade Costa et al. |
| 2002/0126755 | A1* | 9/2002 | Li .................. H04N 19/119 375/240.12 |
| 2007/0073861 | A1 | 3/2007 | Amanuddin et al. |
| 2007/0078527 | A1 | 4/2007 | Gonzalez-Banos et al. |
| 2008/0307240 | A1* | 12/2008 | Dahan .................. G06F 1/06 713/320 |
| 2009/0259865 | A1* | 10/2009 | Sheynblat ............ G06F 1/3203 713/323 |
| 2011/0242043 | A1 | 10/2011 | Yarvis et al. |
| 2013/0207905 | A1 | 8/2013 | Hankins et al. |
| 2013/0262891 | A1 | 10/2013 | Gudlavenkatasiva et al. |
| 2015/0003422 | A1 | 1/2015 | Jin et al. |
| 2015/0049028 | A1 | 2/2015 | Pollmann et al. |
| 2015/0238858 | A1 | 8/2015 | Jeffery et al. |
| 2016/0057511 | A1 | 2/2016 | Mullins et al. |
| 2016/0105707 | A1 | 4/2016 | Chen et al. |
| 2016/0156673 | A1 | 6/2016 | Emmanuel et al. |
| 2016/0187949 | A1* | 6/2016 | Sen .................. H04W 52/0277 713/310 |
| 2016/0202901 | A1 | 7/2016 | Rathod |
| 2016/0370338 | A1 | 12/2016 | Sayfan |
| 2017/0011319 | A1 | 1/2017 | Elliot et al. |
| 2017/0031537 | A1 | 2/2017 | Chen et al. |
| 2017/0127241 | A1 | 5/2017 | Sjolund et al. |
| 2017/0235357 | A1* | 8/2017 | Leung .................. G06F 1/3212 713/310 |
| 2018/0124459 | A1 | 5/2018 | Knox |

FOREIGN PATENT DOCUMENTS

| | | |
|---|---|---|
| CN | 103926995 | 7/2014 |
| CN | 104298335 | 1/2015 |
| CN | 104460935 | 3/2015 |
| CN | 104834517 | 8/2015 |
| CN | 105183137 | 12/2015 |
| CN | 105208642 | 12/2015 |
| CN | 105302274 | 2/2016 |
| CN | 105511849 | 4/2016 |
| CN | 106055078 | 10/2016 |

OTHER PUBLICATIONS

SIPO, First Office Action for CN Application No. 201610379895, dated Jul. 10, 2018.
Liu, "Android Native Development Kit Cookbook," Packt Publishing, 2013, 331 pages.
EPO, Office Action for EP Application No. 17805837, dated May 2, 2019.
WIPO, ISR for International Application No. PCT/CN2017/086528, Aug. 30, 2017.

* cited by examiner

SENSOR PROCESSING METHOD OF MOBILE TERMINAL, NON-TRANSITORY STORAGE MEDIUM, AND ELECTRONIC DEVICE

CROSS-REFERENCE TO RELATED APPLICATIONS

This application is a National phase of International Application No. PCT/CN2017/086528, filed on May 31, 2017, which is based on and claims priority of Chinese Patent Application No. 201610379895.3, entitled "sensor processing method and apparatus for terminal and mobile terminal", filed on May 31, 2016, the entire contents of which are incorporated herein by reference.

FIELD

The present disclosure relates to power consumption processing technologies, and more particularly to a sensor processing method, a storage medium and an electronic device.

BACKGROUND

At present, an intelligence system has become the operating system platform of a smart terminal with greatest user group. Smart terminals has become the most common and importance electronic devices of many users. Various sensors in the smart terminal provide the hardware basement for applying diversity functions. However, the sensor provided on the smart terminal may cause power consumption. When a user watches videos for a long while, there are still many applications reserving sensors, which may cause additional power consumption of the smart terminal, thereby preventing the smart terminal from improving life cycle of the battery.

DISCLOSURE

Embodiments of the present disclosure provide a sensor processing method for a mobile terminal, a storage medium and an electronic device.

Embodiments of the present disclosure provide a sensor processing method for a mobile terminal. The sensor processing method includes: detecting whether the mobile terminal is playing a video; traversing an active connection interface queue for sensors in response to detecting that the mobile terminal is playing the video; determining whether an application corresponding to a connection interface in the active connection interface queue satisfies a filtering condition, in which the filtering condition comprises the application not releasing a sensor connection when the mobile terminal is playing the video; and in response to determining that the application corresponding to the connection interface fails to satisfy the filtering condition, removing the connection interface from the active connection interface queue to release the sensor connection corresponding to the connection interface.

Embodiments of the present disclosure provide a non-transitory storage medium. The storage medium has a plurality of instructions stored therein. The instructions are adapt to be loaded by a processor to perform: detecting whether the mobile terminal is playing a video; traversing an active connection interface queue for sensors in response to detecting that the mobile terminal is playing the video; determining whether an application corresponding to a connection interface in the active connection interface queue satisfies a filtering condition, in which the filtering condition comprises the application not releasing a sensor connection when the mobile terminal is playing the video; and in response to determining that the application corresponding to the connection interface fails to satisfy the filtering condition, removing the connection interface from the active connection interface queue to release the sensor connection corresponding to the connection interface.

Embodiments of the present disclosure provide an electronic device. The electronic device includes a processor and a memory. The memory has a plurality of instructions stored therein. The processor loads the instructions in the memory to perform: detecting whether the mobile terminal is playing a video; traversing an active connection interface queue for sensors in response to detecting that the mobile terminal is playing the video; determining whether an application corresponding to a connection interface in the active connection interface queue satisfies a filtering condition, in which the filtering condition comprises the application not releasing a sensor connection when the mobile terminal is playing the video; and in response to determining that the application corresponding to the connection interface fails to satisfy the filtering condition, removing the connection interface from the active connection interface queue to release the sensor connection corresponding to the connection interface.

BRIEF DESCRIPTION OF THE DRAWINGS

These and other aspects and advantages of embodiments of the present disclosure will become apparent and more readily appreciated from the following descriptions made with reference to the drawings.

EMBODIMENTS OF THE PRESENT DISCLOSURE

Reference will now be made in detail to exemplary embodiments, examples of which are illustrated in the accompanying drawings, in which the same or similar reference numbers throughout the drawings represent the same or similar elements or elements having same or similar functions. Embodiments described below with reference to drawings are merely exemplary and used for explaining the present disclosure, and should not be understood as limitation to the present disclosure.

The principle of the present disclosure described by the foregoing words does not represent a limitation. A person skilled in the art may know that the following many steps and operations may also be implemented in hardware. According to the principle of the present disclosure, operation is performed by using many other general or specific-purpose operations, communications environments or configurations.

An execution subject of embodiments of the present disclosure may be a mobile terminal. The mobile terminal includes a mobile phone (or called as "cell" phone, such as a smart phone), a computer having a mobile terminal such as a tablet computer, and a mobile device built-in a portable, pocket-type, hand-held computer, which can interchange language and/or data via wireless access network, for example, a personal communication service (PCS) phone, a cordless telephone, a session initiation protocol (SIP) phone, a wireless local loop (WLL) station, a personal digital assistant (PDA) or the like, which is not limited herein.

Embodiments of the present disclosure provide a sensor processing method for a mobile terminal, including: detecting whether the mobile terminal is playing a video; traversing an active connection interface queue for sensors in response to detecting that the mobile terminal is playing the video; determining whether an application corresponding to a connection interface in the active connection interface queue satisfies a filtering condition, in which the filtering condition comprises the application not releasing a sensor connection when the mobile terminal is playing the video; and in response to determining that the application corresponding to the connection interface fails to satisfy the filtering condition, removing the connection interface from the active connection interface queue to release the sensor connection corresponding to the connection interface.

In an embodiment, after removing the connection interface from the active connection interface queue to release the sensor connection corresponding to the connection interface, the method further comprises: storing the connection interface removed from the active connection interface queue into a connection queue to be restored; acquiring configuration parameter information of a sensor corresponding to the connection interface; and adding the configuration parameter information into the parameter queue to be restored.

In an embodiment, after adding the configuration parameter information into the parameter queue to be restored, the method further comprises: determining whether all of connection interfaces in the active connection interface queue are traversed; in response to determining that not all of connection interfaces in the active connection interface queue are traversed, traversing a next connection interface in the active connection interface queue.

In an embodiment, after adding the configuration parameter information into the parameter queue to be restored, the method further comprises: in response to detecting that the mobile terminal quits playing the video, traversing the connection queue to be restored; acquiring the configuration parameter information from the parameter queue to be restored; and adding the connection interface corresponding to the configuration parameter information back into the active connection interface queue according to the configuration parameter information, to restore the sensor connection corresponding to connection interface.

In an embodiment, the method further comprises: in response to detecting that the mobile terminal is playing the video, determining whether the mobile terminal quits playing the video within a predetermined time period; in response to determining that the mobile terminal does not quit playing the video within the predetermined time period, traversing the active connection interface queue.

In an embodiment, detecting whether the mobile terminal is playing the video comprises: detecting whether the mobile terminal reserves SCREEN_BRIGHT_WAKE_LOCK and AudioMix Lock; and in response to detecting that the mobile terminal reserves SCREEN_BRIGHT_WAKE_LOCK and AudioMix Lock simultaneously, determining that the mobile terminal is playing the video.

In an embodiment, when determining that the mobile terminal is playing the video, the method further comprises: determining whether a power consumption management function is enabled; and in response to determining that the power consumption management function is enabled, traversing the active connection interface queue.

Figure 1:
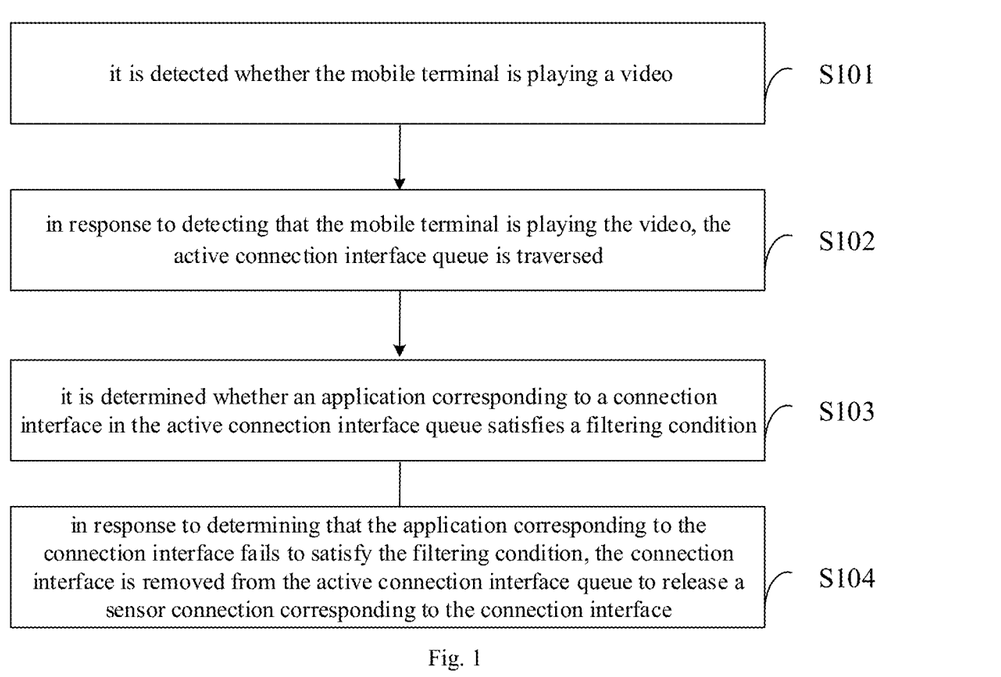
FIG. 1 is a flow chart of a sensor processing method for a mobile terminal according to an embodiment of the present disclosure.

In an embodiment, a sensor processing method for a mobile terminal is provided. Referring to FIG. 1, the sensor processing method is applicable to the mobile terminal, and includes the followings.

At block S101, it is detected whether the mobile terminal is playing a video.

Detecting whether the mobile terminal is playing a video includes detecting whether the mobile terminal reserves SCREEN_BRIGHT_WAKE_LOCK and AudioMix Lock; and in response to detecting that the mobile terminal reserves SCREEN_BRIGHT_WAKE_LOCK and AudioMix Lock simultaneously, determining that the mobile terminal is playing the video.

For example, the mobile terminal has two outstanding features when playing the video: reserving SCREEN_BRIGHT_WAKE_LOCK to keep a screen always bright, and reserving AudioMix Lock to ensure normal playback of audio. Therefore, it can actually identify the video playing scene through two conditions. In a method of acquiring Wake Lock Internal in the power manager service, it is determined whether a type of Application Lock is SCREEN_BRIGHT_WAKE_LOCK. When the type of Application Lock is SCREEN_BRIGHT_WAKE_LOCK, it is determined whether the application reserves AudioMix Lock simultaneously, if yes, it can be considered that the application is playing the video.

However, it can be understood that, the present disclosure is not limited to the above determining ways, any variation, equivalent substitution and modification that fall within the spirit and principle of the present disclosure should be embraced by the protective scope of the present disclosure.

In embodiments of the present disclosure, when the application needs to use a sensor, a connection interface is allocated to the application. Through the connection interface, the application can invoke the sensor to work and add the allocated connection interface to an active connection interface queue for the sensors.

In the following, a functional structure for managing sensors will be described in detail.

In Android system of the mobile terminal, the sensor management framework includes a client, a server, and a hardware abstract layer (HAL). The client encapsulates interfaces of sensors for the application. The server manages all sensor data. The HAL encapsulates direct access of the server to Kernel. The server reads the sensor data from the HAL and writes the sensor data into channel. The client reads server-side data via the channel.

When the application needs to use the sensor, a system sensor manager instance of the client is acquired and a listener interface is registered through the instance. After registering the listener interface, the server can provide a sensor event connection interface to the client. The connection interface is allocated to the application. Through the connection interface, the application can acquire data from the sensor through the client.

When the client registers the listener interface, the server may invoke an enable interface of the sensor to enable the sensor. When the client unregisters the listener interface, the server may invoke a disable interface of the sensor to disable the sensor.

At block S102, in response to detecting that the mobile terminal is playing the video, the active connection interface queue is traversed.

In an embodiment of the present disclosure, after detecting that the mobile terminal is playing the video, the method further includes: in response to detecting that the mobile terminal is playing the video, determining whether a power consumption function is enabled; and in response to determining that the power consumption management function is enabled, traversing the active connection interface queue. In an embodiment, an interface having an enable interface and a disable interface of the power consumption function is provided, when a user clicks the enable interface, the power consumption function can be enabled automatically, and when the user clicks the disable interface, the power consumption function can be disabled automatically.

The active connection interface queue mActiveConnections for the sensors is configured to store current active sensor connections. When the enable interface is invoked, a newly registered connection interface is added to the active connection interface queue mActiveConnections for the sensors. When the disable interface is invoked, a corresponding connection interface is removed from the active connection interface queue mActiveConnections for the sensors.

In order to decrease occurrence of misjudging whether the mobile terminal is playing the video, when detecting that the mobile terminal is playing the video, it is further determined whether the mobile terminal quits playing the video within a predetermined time period; in response to detecting that the mobile terminal does not quit playing the video within the predetermined time period, traversing the active connection interface queue.

At block S103, it is determined whether an application corresponding to a connection interface in the active connection interface queue satisfies a filtering condition. The filtering condition comprises the application not releasing a sensor connection when the mobile terminal is playing the video.

The power consumption management application has a mechanism to determine whether the application is allowed to reserve a sensor when the video is played (i.e., the above-mentioned filtering condition). For example, applications such as movement-type applications, navigation-type applications, and system built-in applications are allowed to reserve the sensor when the video is played, while other applications are forbidden to reserve the sensor when the video is played. Therefore, if an application is allowed to reserve a sensor when the video is played, the application is filtered out in block S103. Applications which are not filtered out in block S103 will perform corresponding operations in block S104.

However, in an embodiment, a list recording applications which are allowed to reserve the sensor when the video is played may be generated by a security module of the mobile terminal, or may be selected by the user, or may be pushed by a cloud server.

In embodiments of the present disclosure, the list recording applications which are allowed to reserve the sensor when the video is played may be stored at the mobile terminal side in a form of document, or may be stored at the mobile terminal side in a form of database, or may be stored on the basis of cloud server.

In the case that the list is stored in a form of document or database, after the mobile terminal enables the power consumption management function, the list recording applications which are allowed to reserve the sensor when the video is played that stored at the mobile terminal side in advance can be invoked from the mobile terminal side.

In the case that the list is stored on the basis of cloud server, after the mobile terminal enables the power consumption management function, the mobile terminal is triggered to read the list recording applications which are allowed to reserve the sensor when the video is played from the color server.

At block S104, in response to determining that the application corresponding to the connection interface fails to satisfy the filtering condition, the connection interface is removed from the active connection interface queue to release a sensor connection corresponding to the connection interface.

For example, the system of the mobile terminal adds a method of releasing and saving the sensor connection (i.e., release And Save Sensor) in the sensor service of native layer. This method traverses the active connection interface queue mActiveConnections, if a connection interface fails to satisfy the filtering condition of the filtering mechanism, a disable method is invoked to release the sensor connection. The connection interface is removed from the active connection interface queue, meanwhile the connection interface is stored in a connection queue to be restored mSavedConnections, the configuration parameter of the sensor corresponding to the connection interface is added in a parameter queue to be restored mSavedParams, such that the sensor connection can be restored after the mobile terminal quits playing the video.

In embodiments of the present disclosure, when the mobile terminal quits playing the video, the sensor connection can be automatically restored as follows.

1. After the connection interface is removed from the active connection interface queue to release the sensor connection corresponding to the connection interface, the connection interface removed from the active connection interface queue is stored in the connection queue to be restored.

2. The configuration parameter information of the sensor corresponding to the removed connection interface is acquired.

3. The configuration parameter information of the sensor is added into the parameter queue to be restored.

4. In response to detecting that the mobile terminal quits playing the video, the connection queue to be restored is traversed.

5. The configuration parameter information of the sensor is acquired from the parameter queue to be restored.

6. The corresponding connection interface is added into the active connection interface queue again according to the configuration parameter information of the sensor, to restore the corresponding sensor connection.

For example, the system of the mobile terminal adds a method of restoring the sensor connection, i.e., restore Sensor, into the system service Sensor Service of the native layer. The restore Sensor method traverses the connection queue to be restored mSavedConnections, the corresponding sensor configuration parameter is acquired from the parameter queue to be restored mSavedParams, and an enable method is invoked to restore the corresponding sensor connection, meanwhile the connection interface is added into the active connection interface queue mActiveConnections again.

With the sensor processing method for a mobile terminal according to embodiments of the present disclosure, it is detected whether the mobile terminal is playing the video. The active connection interface queue for the sensor is traversed in response to detecting that the mobile terminal is playing the video. It is determined whether an application corresponding to a connection interface in the active connection interface queue satisfies the filtering condition, the filtering condition including the application not releasing a sensor connection when the mobile terminal is playing the video. In response to detecting that the application corresponding to the connection interface fails to satisfy the filtering condition, the connection interface is removed from the active connection interface queue to release the sensor connection corresponding to the connection interface. In the present disclosure, the sensor connection satisfying predetermined requirements can be released automatically when the video is played, and the sensor connection is restored when the mobile terminal quits playing the video. In this way, the power consumption of the mobile terminal can be reduced effectively, thereby improving the life cycle of the mobile terminal.

Figure 2:
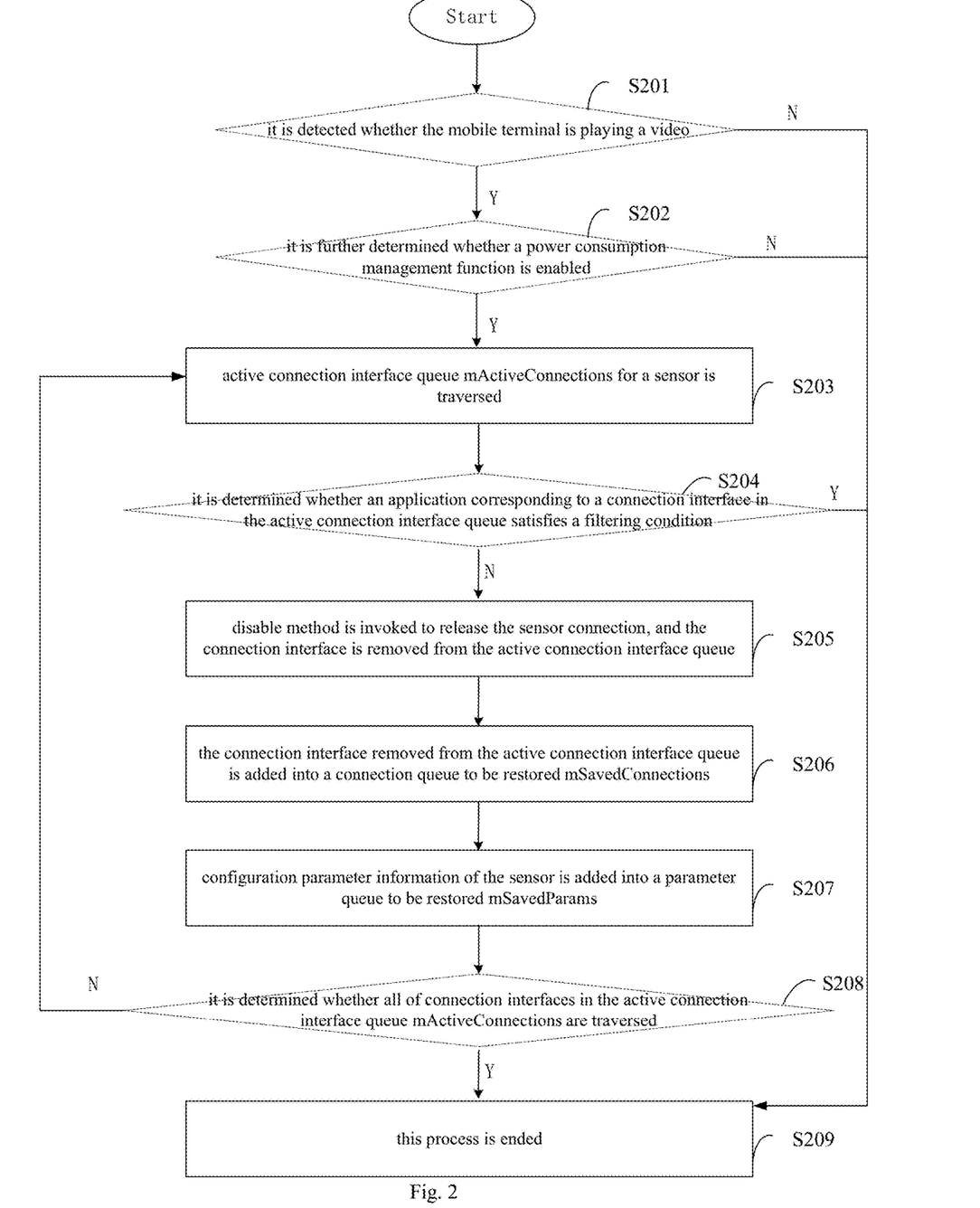
FIG. 2 is a flow chart of a process of releasing a sensor connection according to an embodiment of the present disclosure.

In an embodiment, referring to FIG. 2, a process of releasing a sensor connection according to an embodiment of the present disclosure is illustrated.

The process of releasing the sensor connection is applicable to a mobile terminal and includes the followings.

At block S201, it is detected whether the mobile terminal is playing a video (i.e., whether to enter playing of the video).

At block S202, in response to detecting that the video is played, it is further determined whether a power consumption management function is enabled.

At block S203, in response to determining that the power consumption management function is enabled, an active connection interface queue mActiveConnections for sensors is traversed.

At block S204, it is determined whether an application corresponding to a connection interface in the active connection interface queue satisfies a filtering condition. The filtering condition includes the application not releasing the sensor connection when the mobile terminal is playing the video.

The power consumption management application stores a mechanism to determine whether an application is allowed to reserve a sensor when the video is played (i.e., the above-mentioned filtering condition). Applications such as movement-type applications, navigation-type applications, system built-in applications are allowed to reserve the sensor when the video is played. Other applications are forbidden to reserve the sensor when the video is played.

In this block, for example, in response to determining the application corresponding to a connection interface in the active connection interface queue is not one of the movement-type applications, the navigation-type applications and the system built-in applications, it can determine that the application corresponding to the connection interface fails to satisfy the filtering condition. Thus, the sensor connection needs to be released.

At block S205, in response to determining that the application corresponding to the connection interface fails to satisfy the filtering condition, the disable method is invoked to release the sensor connection, and the connection interface is removed from the active connection interface queue.

At block S206, the connection interface removed from the active connection interface queue is added into a connection queue to be restored mSavedConnections.

At block S207, configuration parameter information of the sensor is added into a parameter queue to be restored mSavedParams.

At block S208, it is determined whether all of connection interfaces in the active connection interface queue mActiveConnections are traversed.

At block S209, in response to determining that all of connection interfaces in the active connection interface queue mActiveConnections are traversed, this process is ended. In response to determining that not all of connection interfaces in the active connection interface queue mActiveConnections are traversed, an act of block S203 is executed to traverse a nest connection interface in the active connection interface queue mActiveConnections.

Figure 3:
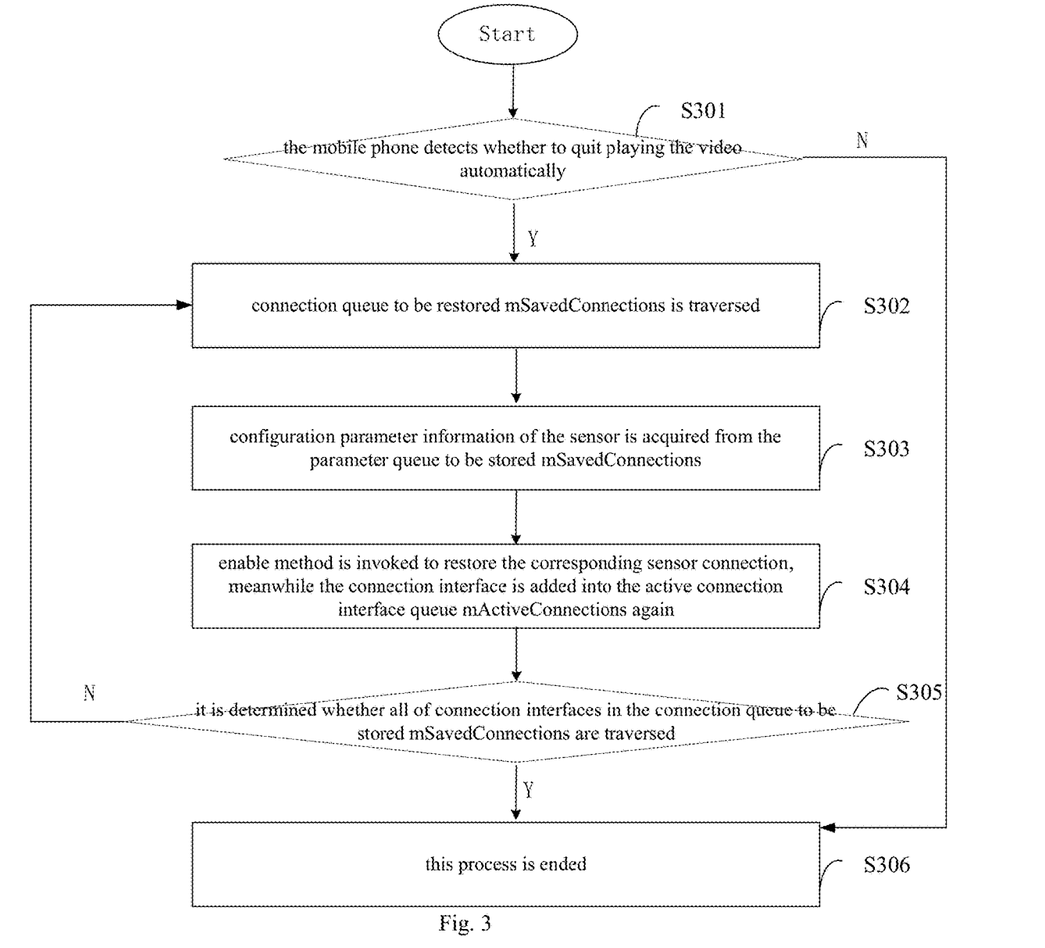
FIG. 3 is a flow chart of a process of restoring a sensor connection according to an embodiment of the present disclosure.

In an embodiment, referring to FIG. 3, a process of restoring a sensor connection according to an embodiment of the present disclosure is illustrated.

The process of restoring the sensor connection is applicable to a mobile terminal and includes the followings.

At block S301, the mobile phone detects whether to quit playing the video automatically.

At block S302, in response to detecting that the mobile phone quits playing the video, the connection queue to be restored mSavedConnections is traversed.

At block S303, the configuration parameter information of the sensor is acquired from the parameter queue to be stored mSavedConnections.

At block S304, the enable method is invoked to restore the corresponding sensor connection, meanwhile the connection interface is added into the active connection interface queue mActiveConnections again.

At block S305, it is determined whether all of connection interfaces in the connection queue to be stored mSavedConnections are traversed.

At block S306, in response to determining that all of connection interfaces in the connection queue to be stored mSavedConnections are traversed, this process is ended. In response to determining that not all of connection interfaces in the connection queue to be stored mSavedConnections are traversed, the act in block S302 is executed to traverse a next connection interface of the connection queue to be stored mSavedConnections.

With the sensor processing method for the mobile terminal, it is detected whether the mobile terminal is playing the video. In response to detecting that the mobile terminal is playing the video, the active connection interface queue for the sensors is traversed. It is determined whether an application corresponding to a connection interface in the active connection interface queue satisfies the filtering condition, the filtering condition including the application not releasing a sensor connection when the mobile terminal is playing the video. In response to detecting that the application corresponding to the connection interface fails to satisfy the filtering condition, the connection interface is removed from the active connection interface queue to release the sensor connection corresponding to the connection interface. In the present disclosure, the sensor connection satisfying predetermined requirements can be released automatically when the video is played, and the sensor connection is restored when the mobile terminal quits playing the video. In this way, the power consumption of the mobile terminal can be reduced effectively, thereby improving the life cycle of the mobile terminal.

The embodiments of the present disclosure provide a sensor processing apparatus for a mobile terminal. The sensor processing apparatus for the mobile terminal includes a video detecting module, a first traversing module, a filter determining module and a removing module.

The video detecting module is configured to detect whether the mobile terminal is playing a video.

The first filtering module is configured to traverse an active connection interface queue for sensors in response to detecting that the mobile terminal is playing the video.

The filter determining module is configured to determine whether an application corresponding to a connection interface in the active connection interface queue satisfies a filtering condition, in which the filtering condition comprises the application not releasing a sensor connection when the mobile terminal is playing the video.

The removing module is configured to, in response to determining that the application corresponding to the connection interface fails to satisfy the filtering condition, remove the connection interface from the active connection interface queue to release the sensor connection corresponding to the connection interface.

In an embodiment, the sensor processing apparatus further includes a storing module, a first parameter acquiring module, and a parameter adding module.

The storing module is configured to store the connection interface removed from the active connection interface queue into a connection queue to be restored.

The first parameter acquiring module is configured to acquire configuration parameter information of a sensor corresponding to the connection interface; and The parameter adding module is configured to add the configuration parameter information into the parameter queue to be restored.

In an embodiment, the sensor processing apparatus further includes a second traversing module, a second parameter acquiring module, and an interface adding module.

The second traversing module is configured to, in response to detecting that the mobile terminal quits playing the video, traverse the connection queue to be restored.

The second parameter acquiring module is configured to acquire the configuration parameter information from the parameter queue to be restored.

The interface adding module is configured to add the connection interface corresponding to the configuration parameter information back into the active connection interface queue according to the configuration parameter information, to restore the sensor connection corresponding to connection interface.

In an embodiment, the sensor processing apparatus further includes a time determining module configured to, in response to detecting that the mobile terminal is playing the video, determine whether the mobile terminal quits playing the video within a predetermined time period.

The first traversing module is configured to, in response to determining that the mobile terminal does not quit playing the video within the predetermined time period, traverse the active connection interface queue.

In an embodiment, the video detecting module includes a lock detecting module and a determining module.

The lock detecting module is configured to detect whether the mobile terminal reserves SCREEN_BRIGHT_WAKE_LOCK and AudioMix Lock.

The determining module is configured to, in response to detecting that the mobile terminal reserves SCREEN_BRIGHT_WAKE_LOCK and AudioMix Lock simultaneously, determine that the mobile terminal is playing the video.

In an embodiment, the first traversing module is configured to determine whether a power consumption management function is enabled in response to detecting that the mobile terminal is playing the video, and in response to determining that the power consumption management function is enabled, traverse the active connection interface queue.

Figure 4:
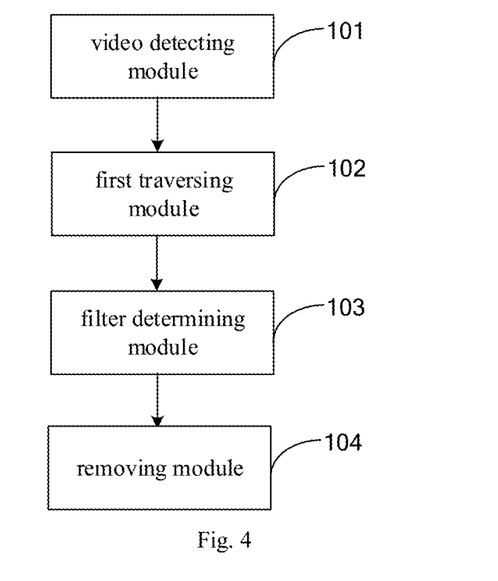
FIG. 4 is a block diagram of a sensor processing apparatus for a mobile terminal according to an embodiment of the present disclosure.
Figure 5:
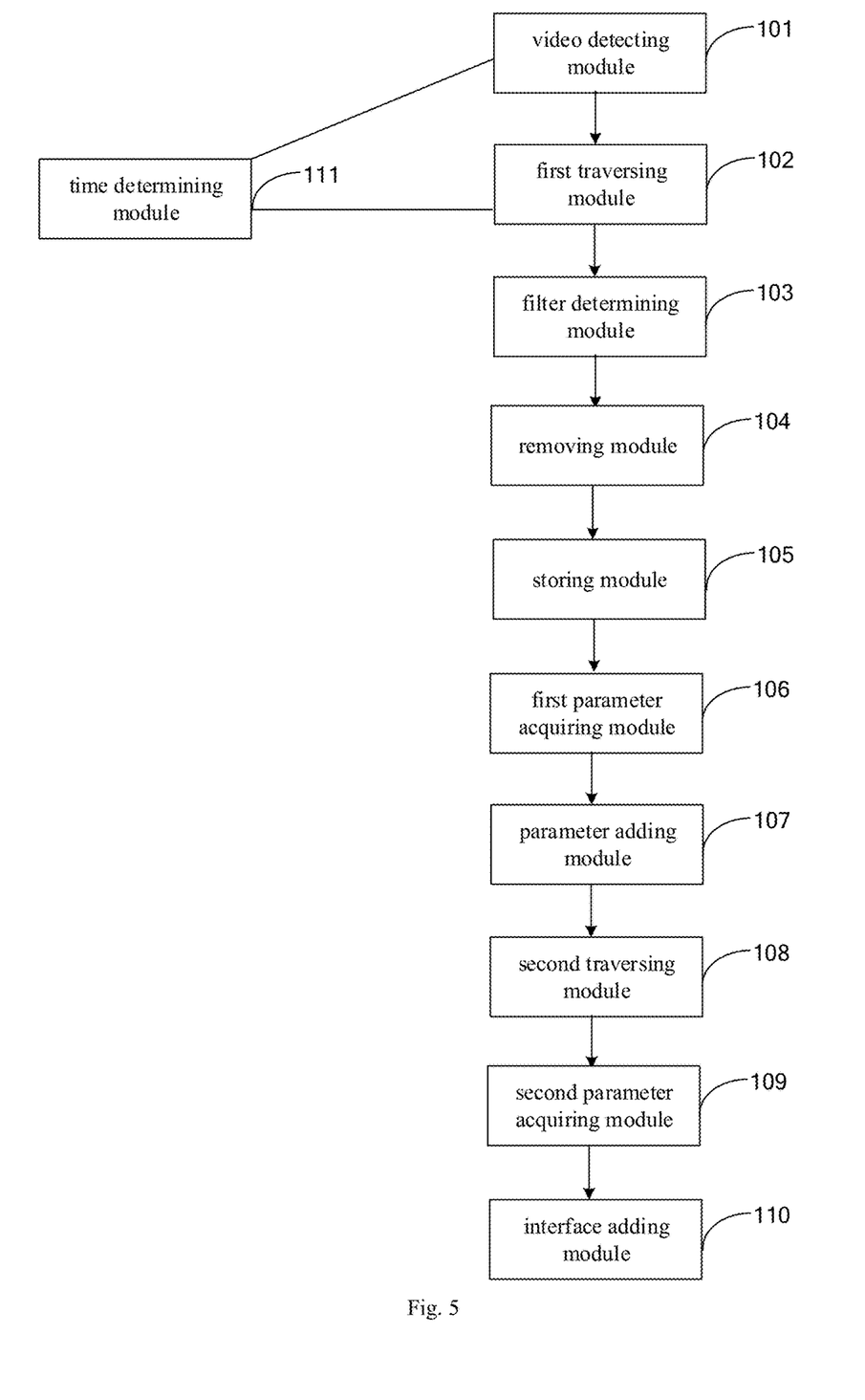
FIG. 5 is a block diagram of functional components in a sensor processing apparatus for a mobile terminal according to an embodiment of the present disclosure.

In an embodiment, referring to FIG. 4 together with FIG. 5, components of the sensor processing apparatus for the mobile terminal according to embodiments of the present disclosure are illustrated. For ease of description, only related components are illustrated. The sensor processing apparatus for the mobile terminal includes a video detecting module 101, a first traversing module 102, a filter determining module 103 and a removing module 104. The sensor processing apparatus for the mobile terminal may be a software unit, a hardware unit or a unit in combination with software and hardware built in the mobile terminal.

The video detecting module 101 is configured to detect whether the mobile terminal is playing a video.

Detecting whether the mobile terminal is playing a video comprises: detecting whether the mobile terminal reserves SCREEN_BRIGHT_WAKE_LOCK and AudioMix Lock; and in response to detecting that the mobile terminal reserves SCREEN_BRIGHT_WAKE_LOCK and AudioMix Lock simultaneously, determining that the mobile terminal is playing the video.

For example, the mobile terminal has two outstanding features when playing the video: reserving SCREEN_BRIGHT_WAKE_LOCK to keep a screen always bright, and reserving AudioMix Lock to ensure normal playback of audio. Therefore, it can actually identify the video playing scene through two conditions. In a method of acquiring Wake Lock Internal in the power manager service, it is determined whether a type of Application Lock is SCREEN_BRIGHT_WAKE_LOCK. When the type of Application Lock is SCREEN_BRIGHT_WAKE_LOCK, it is determined whether the application reserves AudioMix Lock simultaneously, if yes, it can be considered that the application is playing the video.

However, it can be understood that, the present disclosure is not limited to the above determining ways, any variation, equivalent substitution and modification that fall within the spirit and principle of the present disclosure should be embraced by the protective scope of the present disclosure.

The first filtering module 102 is configured to traverse an active connection interface queue for sensors in response to detecting that the mobile terminal is playing the video.

The filter determining module 103 is configured to determine whether an application corresponding to a connection interface in the active connection interface queue satisfies a filtering condition, in which the filtering condition comprises the application not releasing a sensor connection when the mobile terminal is playing the video.

The power consumption management application has a mechanism to determine whether the application is allowed to reserve a sensor when the video is played (i.e., the above-mentioned filtering condition). For example, applications such as movement-type applications, navigation-type applications, and system built-in applications are allowed to reserve the sensor when the video is played, while other applications are forbidden to reserve the sensor when the video is played.

The removing module 104 is configured to, in response to determining that the application corresponding to the connection interface fails to satisfy the filtering condition, remove the connection interface from the active connection interface queue to release the sensor connection corresponding to the connection interface.

Further, the sensor processing apparatus further includes a storing module 105, a first parameter acquiring module 106, and a parameter adding module 107.

The storing module 105 is configured to store the connection interface removed from the active connection interface queue into a connection queue to be restored.

The first parameter acquiring module 106 is configured to acquire configuration parameter information of a sensor corresponding to the connection interface; and The parameter adding module 107 is configured to add the configuration parameter information into the parameter queue to be restored.

Further, the sensor processing apparatus further includes a second traversing module 108, a second parameter acquiring module 109, and an interface adding module 110.

The second traversing module 108 is configured to, in response to detecting that the mobile terminal quits playing the video, traverse the connection queue to be restored.

The second parameter acquiring module 109 is configured to acquire the configuration parameter information from the parameter queue to be restored.

The interface adding module 110 is configured to add the connection interface corresponding to the configuration parameter information back into the active connection interface queue according to the configuration parameter information, to restore the sensor connection corresponding to connection interface.

Further, the sensor processing apparatus further includes a time determining module 111 configured to, in response to detecting that the mobile terminal is playing the video, determine whether the mobile terminal quits playing the video within a predetermined time period.

The first traversing module 102 is configured to, in response to determining that the mobile terminal does not quit playing the video within the predetermined time period, traverse the active connection interface queue.

Further, the video detecting module includes a lock detecting module and a determining module.

The lock detecting module is configured to detect whether the mobile terminal reserves SCREEN_BRIGHT_WAKE_LOCK and AudioMix Lock.

The determining module is configured to, in response to detecting that the mobile terminal reserves SCREEN_BRIGHT_WAKE_LOCK and AudioMix Lock simultaneously, determine that the mobile terminal is playing the video.

In practical, the above-mentioned respective modules may be implemented as separated entities or may be combined in any way, for example, implemented as the same or several entities. The embodiments of the above-mentioned respective modules may refer to the method embodiments, which is not described herein.

With the sensor processing apparatus for the mobile terminal, it is detected whether the mobile terminal is playing the video. In response to detecting that the mobile terminal is playing the video, the active connection interface queue for the sensors is traversed. It is determined whether an application corresponding to a connection interface in the active connection interface queue satisfies the filtering condition, the filtering condition including the application not releasing a sensor connection when the mobile terminal is playing the video. In response to detecting that the application corresponding to the connection interface fails to satisfy the filtering condition, the connection interface is removed from the active connection interface queue to release the sensor connection corresponding to the connection interface. In the present disclosure, the sensor connection satisfying predetermined requirements can be released automatically when the video is played, and the sensor connection is restored when the mobile terminal quits playing the video. In this way, the power consumption of the mobile terminal can be reduced effectively, thereby improving the life cycle of the mobile terminal.

In an embodiment, embodiments of the present disclosure further improve a storage medium having a plurality of instructions stored therein. The plurality of instructions are adapt to be loaded by a processor to perform: detecting whether the mobile terminal is playing a video; traversing an active connection interface queue for sensors in response to detecting that the mobile terminal is playing the video; determining whether an application corresponding to a connection interface in the active connection interface queue satisfies a filtering condition, in which the filtering condition comprises the application not releasing a sensor connection when the mobile terminal is playing the video; and in response to determining that the application corresponding to the connection interface fails to satisfy the filtering condition, removing the connection interface from the active connection interface queue to release the sensor connection corresponding to the connection interface.

Figure 6:
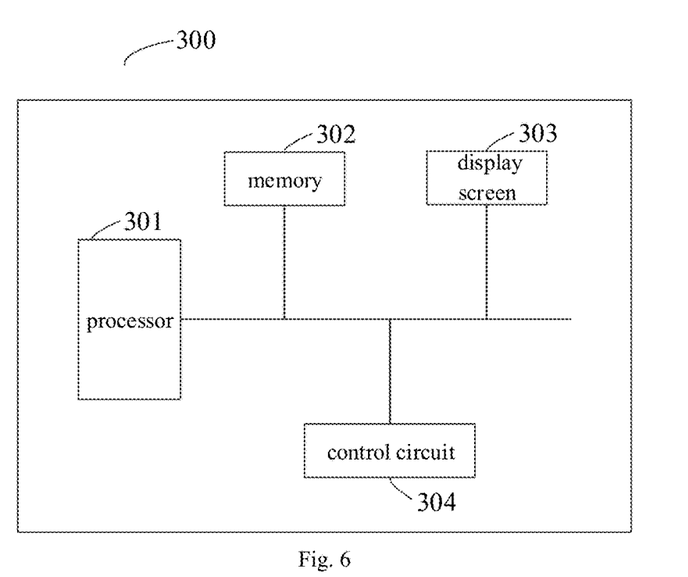
FIG. 6 is a schematic diagram of an electronic device according to an embodiment of the present disclosure.

In an embodiment, an electronic device is provided. The electronic device may be a smart phone, a tablet computer or the like. As illustrated in FIG. 6, the electronic device 300 includes a processor 301, a memory 302, a display screen 303 and a control circuit 304. The processor 301 is electrically coupled to the memory 302, the display screen 303 and the control circuit respectively.

The processor 301 is a control center of the electronic device 300, which can be coupled to respective components of the electronic device 300 via various interfaces and wires, and can perform various functions and processing data of the electronic device by running software programs stored in the memory 302 and invoking data stored in the memory 302.

In an embodiment, the processor 301 in the electronic device 300 can load instructions corresponding to one or more processes of application in the memory 302 and run the application stored in the memory 302 to implement various functions by performing: detecting whether the mobile terminal is playing a video; traversing an active connection interface queue for sensors in response to detecting that the mobile terminal is playing the video; determining whether an application corresponding to a connection interface in the active connection interface queue satisfies a filtering condition, in which the filtering condition comprises the application not releasing a sensor connection when the mobile terminal is playing the video; and in response to determining that the application corresponding to the connection interface fails to satisfy the filtering condition, removing the connection interface from the active connection interface queue to release the sensor connection corresponding to the connection interface.

In an embodiment, after removing the connection interface from the active connection interface queue to release the sensor connection corresponding to the connection interface, the processor 301 is configured to perform: storing the connection interface removed from the active connection interface queue into a connection queue to be restored; acquiring configuration parameter information of a sensor corresponding to the connection interface; and adding the configuration parameter information into a parameter queue to be restored.

In an embodiment, the processor 301 is configured to perform: in response to detecting that the mobile terminal quits playing the video, traversing the connection queue to be restored; acquiring the configuration parameter information from the parameter queue to be restored; and adding the connection interface corresponding to the configuration parameter information back into the active connection interface queue according to the configuration parameter information, to restore the sensor connection corresponding to connection interface.

In an embodiment, the processor 301 is configured to perform: in response to detecting that the mobile terminal is playing the video, determining whether the mobile terminal quits playing the video within a predetermined time period; in response to determining that the mobile terminal does not quit playing the video within the predetermined time period, traversing the active connection interface queue.

In an embodiment, the processor 301 is configured to perform: detecting whether the mobile terminal reserves SCREEN_BRIGHT_WAKE_LOCK and AudioMix Lock; and in response to detecting that the mobile terminal reserves SCREEN_BRIGHT_WAKE_LOCK and AudioMix Lock simultaneously, determining that the mobile terminal is playing the video.

In an embodiment, when determining that the mobile terminal is playing the video, the processor 301 is configured to perform: determining whether a power consumption management function is enabled; and in response to determining that the power consumption management function is enabled, traversing the active connection interface queue.

The memory 302 may be configured to store applications and data. The applications stored in comprise instructions executable by the processor. The applications can compose various functional modules. The processor 301 performs various functional applications and data processing by running the applications stored in the memory 302.

The display screen 303 may be configured to display information inputted by the user, information provided to the user and various graphic user interfaces of the terminal. These graphic user interfaces may constitute images, text, icons, videos or any combination thereof.

The control circuit 304 is electrically coupled to the display screen 303, configured to control the display screen 303 to display information.

Figure 7:
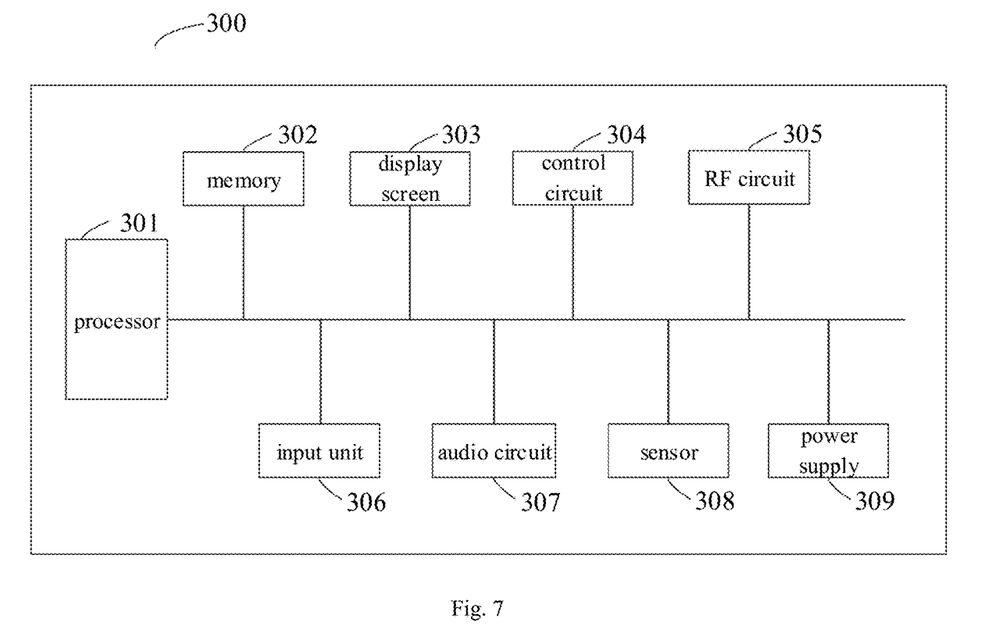
FIG. 7 is a schematic diagram of an electronic device according to another embodiment of the present disclosure.

In some embodiments, as illustrated in FIG. 7, the electronic device 300 further includes a radio frequency (RF) circuit 305, an input unit 306, an audio circuit 307, a sensor 308, and a power supply 309. The processor 301 is electrically coupled to the RF circuit 305, the input circuit 306, the audio circuit 307, the sensor 308, and the power supply 309.

The RF circuit 305 may be configured to receive and send RF signals to establish wireless communication between network devices or other electronic devices via wireless communication mode. The RF circuit 305 may be configured to receive and send signals with the network devices and other electronic devices.

The input unit 306 may be configured to receive input digital or character information, or user characteristic information (such as fingerprint) to generate keypad input, mouse input, joystick input, optical or trackball input related to the user setting and functional control. The input unit 306 may include a fingerprint identification component.

The audio circuit 307 may provide audio interfaces between the user and the terminal through a loudspeaker, and a microphone.

The electronic device 300 may further include at least one sensor 308, such as an optical sensor, a motion sensor and other sensors. The optical sensor may include an ambient light sensor and a proximity sensor. The ambient light sensor can adjust luminance of the display panel according to brightness of the ambient light. The proximity sensor may switch off the display panel and/or backlight when the terminal is moved to the ear. As one type of motion sensor, an acceleration sensor can detect acceleration values in various directions (generally on three axes), may detect magnitude and a direction of the gravity when the mobile phone is static, and may be applied to an application that recognizes the attitude of the mobile phone (for example, landscape/portrait screen switching, a related game, and magnetometer attitude calibration), a function related to vibration recognition (such as a pedometer and a knocking), and the like. In addition, the terminal can be configured with other sensors, such as a barometer, a hygrometer, a thermometer, and an infrared sensor, which are not further described herein.

The power supply 309 is configured for supplying power to the components of the electronic device 300. In some embodiments, the power supply 309 may be logically coupled with the processor 301 by using a power management system, thereby implementing functions such as charging, discharging and power consumption management by using the power management system.

Although not illustrated in the FIG. 7, the electronic device 300 may further include a camera, a Bluetooth component and the like, which is not further described herein.

With the electronic device provided by embodiments of the present disclosure, it is detected whether the mobile terminal is playing the video. In response to detecting that the mobile terminal is playing the video, the active connection interface queue for the sensor is traversed. It is determined whether an application corresponding to a connection interface in the active connection interface queue satisfies the filtering condition, the filtering condition including the application not releasing a sensor connection when the mobile terminal is playing the video. In response to detecting that the application corresponding to the connection interface fails to satisfy the filtering condition, the connection interface is removed from the active connection interface queue to release the sensor connection corresponding to the connection interface. In the present disclosure, the sensor connection satisfying predetermined requirements can be released automatically when the video is played, and the sensor connection is restored when the mobile terminal quits playing the video. In this way, the power consumption of the mobile terminal can be reduced effectively, thereby improving the life cycle of the mobile terminal.

It should be understood that all or a part of the method provided by the present disclosure may be realized by programs instructing relative hardware, the programs may be stored in a computer-readable memory. The memory may include a read-only memory ROM, a random access memory RAM, a magnet disk, an optical disk and the like.

Although embodiments of present disclosure have been shown and described above, it should be understood that above embodiments are just explanatory, and cannot be construed to limit the present disclosure, for those skilled in the art, changes, alternatives, and modifications can be made to the embodiments without departing from spirit, principles and scope of the present disclosure.

What is claimed is:

1. A sensor processing method for a mobile terminal, comprising:
   detecting whether the mobile terminal is playing a video and whether the video has been played for a predetermined time period;
   traversing an active connection interface queue for sensors in response to detecting that the mobile terminal is playing the video and the video has been played for the predetermined time period, wherein the active connection interface queue stores a current active sensor connection for a sensor with an invoked enable interface;
   determining whether an application corresponding to a connection interface in the active connection interface queue satisfies a filtering condition, wherein the filtering condition comprises the application not releasing a sensor connection when the mobile terminal is playing the video; and
   in response to determining that the application corresponding to the connection interface fails to satisfy the filtering condition, removing the connection interface from the active connection interface queue to release the sensor connection corresponding to the connection interface.

2. The sensor processing method according to claim 1, wherein after removing the connection interface from the active connection interface queue to release the sensor connection corresponding to the connection interface, the method further comprises:
   storing the connection interface removed from the active connection interface queue into a connection queue to be restored;
   acquiring configuration parameter information of a sensor corresponding to the connection interface; and
   adding the configuration parameter information into a parameter queue to be restored.

3. The sensor processing method according to claim 1, further comprising:
   in response to detecting that the mobile terminal is playing the video, determining whether the mobile terminal quits playing the video within the predetermined time period;
   in response to determining that the mobile terminal does not quit playing the video within the predetermined time period, traversing the active connection interface queue.

4. The sensor processing method according to claim 1, wherein detecting whether the mobile terminal is playing the video comprises:
   detecting whether the mobile terminal reserves SCREEN_BRIGHT_WAKE_LOCK and AudioMix Lock; and
   in response to detecting that the mobile terminal reserves SCREEN_BRIGHT_WAKE_LOCK and AudioMix Lock simultaneously, determining that the mobile terminal is playing the video.

5. The sensor processing method according to claim 1, wherein when determining that the mobile terminal is playing the video, the method further comprises:
   determining whether a power consumption management function is enabled; and
   in response to determining that the power consumption management function is enabled, traversing the active connection interface queue;
   wherein the power consumption management function allows the mobile terminal to determine whether an application installed on the mobile terminal is allowed to reserve a sensor when the video is played on the mobile terminal, when the application is at least one of a movement-type application, a navigation-type application, and a system built-in application, the application is allowed to reserve the sensor when the video is played, and other applications are forbidden to reserve the sensor when the video is played.

6. The sensor processing method according to claim 1, wherein determining whether an application corresponding to a connection interface in the active connection interface queue satisfies a filtering condition comprises:
   acquiring a list recording applications each allowed to reserve a sensor when the mobile terminal is playing the video;
   determining whether the application is in the list; and
   determining that the application satisfies a filtering condition when the application is in the list.

7. The sensor processing method according to claim 2, wherein after adding the configuration parameter information into the parameter queue to be restored, the method further comprises:
   determining whether all of connection interfaces in the active connection interface queue are traversed;
   in response to determining that not all of connection interfaces in the active connection interface queue are traversed, traversing a next connection interface in the active connection interface queue.

8. The sensor processing method according to claim 2, wherein after adding the configuration parameter information into the parameter queue to be restored, the method further comprises:
   in response to detecting that the mobile terminal quits playing the video, traversing the connection queue to be restored;
   acquiring the configuration parameter information from the parameter queue to be restored; and
   adding the connection interface corresponding to the configuration parameter information back into the active connection interface queue according to the configuration parameter information, to restore the sensor connection corresponding to connection interface.

9. The sensor processing method according to claim 4, wherein detecting whether the mobile terminal reserves SCREEN_BRIGHT_WAKE_LOCK and AudioMix Lock comprises:
   detecting whether a type of an application lock is SCREEN_BRIGHT_WAKE_LOCK; and
   in response detecting that the type of the application lock is SCREEN_BRIGHT_WAKE_LOCK, determining whether the mobile terminal reserves AudioMix Lock simultaneously.

10. The sensor processing method according to claim 6, wherein the list is stored in the mobile terminal; and acquiring the list recording applications each allowed to reserve a sensor when the mobile terminal is playing the video comprises:
    invoking the list stored in the mobile terminal.

11. The sensor processing method according to claim 6, wherein the list is stored in a cloud server; and acquiring the list recording applications each allowed to reserve a sensor when the mobile terminal is playing the video comprises:
reading the list from the cloud server.

12. A non-transitory storage medium, having stored therein a plurality of instructions applicable to be loaded by a processor to perform:
   detecting whether the mobile terminal is playing a video and whether the video has been played for a predetermined time period;
   traversing an active connection interface queue for sensors in response to detecting that the mobile terminal is playing the video and the video has been played for the predetermined time period, wherein the active connection interface queue stores a current active sensor connection for a sensor with an invoked enable interface;
   determining whether an application corresponding to a connection interface in the active connection interface queue satisfies a filtering condition, wherein the filtering condition comprises the application not releasing a sensor connection when the mobile terminal is playing the video; and
   in response to determining that the application corresponding to the connection interface fails to satisfy the filtering condition, removing the connection interface from the active connection interface queue to release the sensor connection corresponding to the connection interface.

13. The non-transitory storage medium according to claim 12, wherein after removing the connection interface from the active connection interface queue to release the sensor connection corresponding to the connection interface, the plurality of instructions are further loaded by the processor to perform:
   storing the connection interface removed from the active connection interface queue into a connection queue to be restored;
   acquiring configuration parameter information of a sensor corresponding to the connection interface; and
   adding the configuration parameter information into a parameter queue to be restored.

14. The non-transitory storage medium according to claim 13, wherein after adding the configuration parameter information into the parameter queue to be restored, the plurality of instructions are further loaded by the processor to perform:
   determining whether all of connection interfaces in the active connection interface queue are traversed;
   in response to determining that not all of connection interfaces in the active connection interface queue are traversed, traversing a next connection interface in the active connection interface queue.

15. An electronic device, comprising a processor, and a memory having stored therein a plurality of instructions, wherein by loading the plurality of instructions stored in the memory, the processor is configured to perform:
   detecting whether the mobile terminal is playing a video and whether the video has been played for a predetermined time period;
   traversing an active connection interface queue for sensors in response to detecting that the mobile terminal is playing the video and the video has been played for the predetermined time period, wherein the active connection interface queue stores a current active connection for a sensor with an invoked enable interface;
   determining whether an application corresponding to a connection interface in the active connection interface queue satisfies a filtering condition, wherein the filtering condition comprises the application not releasing a sensor connection when the mobile terminal is playing the video; and
   in response to determining that the application corresponding to the connection interface fails to satisfy the filtering condition, removing the connection interface from the active connection interface queue to release the sensor connection corresponding to the connection interface.

16. The electronic device according to claim 15, wherein after removing the connection interface from the active connection interface queue to release the sensor connection corresponding to the connection interface, the processor is further configured to perform:
   storing the connection interface removed from the active connection interface queue into a connection queue to be restored;
   acquiring configuration parameter information of a sensor corresponding to the connection interface; and
   adding the configuration parameter information into a parameter queue to be restored.

17. The electronic device according to claim 15, wherein the processor is further configured to perform:
   in response to detecting that the mobile terminal is playing the video, determining whether the mobile terminal quits playing the video within the predetermined time period;
   in response to determining that the mobile terminal does not quit playing the video within the predetermined time period, traversing the active connection interface queue.

18. The electronic device according to claim 15, wherein the processor is further configured to perform:
   detecting whether the mobile terminal reserves SCREEN_BRIGHT_WAKE_LOCK and AudioMix Lock; and
   in response to detecting that the mobile terminal reserves SCREEN_BRIGHT_WAKE_LOCK and AudioMix Lock simultaneously, determining that the mobile terminal is playing the video.

19. The electronic device according to claim 15, wherein when determining that the mobile terminal is playing the video, the processor is further configured to perform:
   determining whether a power consumption management function is enabled; and
   in response to determining that the power consumption management function is enabled, traversing the active connection interface queue wherein the power consumption management function allows the mobile terminal to determine whether an application installed on the mobile terminal is allowed to reserve a sensor when the video is played on the mobile terminal, when the application is at least one of a movement-type application, a navigation-type application, and a system built-in application, the application is allowed to reserve the sensor when the video is played, and other applications are forbidden to reserve the sensor when the video is played.

20. The electronic device according to claim 16, wherein after adding the configuration parameter information into the parameter queue to be restored, the processor is further configured to perform:
   in response to detecting that the mobile terminal quits playing the video, traversing the connection queue to be restored;

acquiring the configuration parameter information from the parameter queue to be restored;

adding a corresponding connection interface back into the active connection interface queue according to the configuration parameter information, to restore a corresponding sensor connection.

\* \* \* \* \*